US012795588B2

(12) United States Patent
Shoji

(10) Patent No.: US 12,795,588 B2
(45) Date of Patent: Nov. 10, 2026

(54) COMMUNICATION APPARATUS, METHOD FOR CONTROLLING SAME, POSITION MANAGEMENT SYSTEM, AND NON-TRANSITORY COMPUTER-READABLE STORAGE MEDIUM

(71) Applicant: CANON KABUSHIKI KAISHA, Tokyo (JP)

(72) Inventor: Kazuki Shoji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 322 days.

(21) Appl. No.: 18/435,646

(22) Filed: Feb. 7, 2024

(65) Prior Publication Data

US 2024/0267876 A1 Aug. 8, 2024

(30) Foreign Application Priority Data

Feb. 8, 2023 (JP) ................................ 2023-017827

(51) Int. Cl.
*H04W 64/00* (2009.01)
*G01S 13/75* (2006.01)
*G01S 13/87* (2006.01)

(52) U.S. Cl.
CPC .......... *H04W 64/00* (2013.01); *G01S 13/751* (2013.01); *G01S 13/878* (2013.01)

(58) Field of Classification Search
None
See application file for complete search history.

(56) References Cited

U.S. PATENT DOCUMENTS

2012/0242457 A1* 9/2012 Murakami ......... G06K 7/10099 340/10.1
2024/0175963 A1* 5/2024 Fahim .................. G01S 5/0036

FOREIGN PATENT DOCUMENTS

JP 2021141415 A 9/2021

* cited by examiner

*Primary Examiner* — Frantz Bataille
(74) *Attorney, Agent, or Firm* — Canon U.S.A., Inc. IP Division

(57) ABSTRACT

A communication apparatus obtains first position information by performing communication with a wireless device serving as a reference for identifying a position, using a first communication function, measures a positional relationship with an external apparatus based on communication with the external apparatus performed using a second communication function different from the first communication function, obtains second position information based on the measured positional relationship, and selects either the first position information or the second position information, for position management of another wireless device with which communication is to be performed using the first communication function.

16 Claims, 13 Drawing Sheets

COMMUNICATION APPARATUS, METHOD FOR CONTROLLING SAME, POSITION MANAGEMENT SYSTEM, AND NON-TRANSITORY COMPUTER-READABLE STORAGE MEDIUM

BACKGROUND

Field

The present disclosure relates to a communication apparatus, a method for controlling the same, a position management system, and a non-transitory computer-readable storage medium.

Description of the Related Art

Systems that manage articles using RFID reader devices (RFID readers hereinafter) and RFID passive tags (RFID tags hereinafter) are widely used in distribution management, stocktaking management, and the like. Note that RFID is an abbreviation for Radio Frequency Identification. Also, RFID that uses the UHF band can read a plurality of RFID tags at once over comparatively long distances, for example, and is suitable for systems that manage articles in warehouses, for example. Note that UHF is an abbreviation for ultra high frequency. In such a system, an RFID reader carried by a user obtains position information by reading an RFID tag (a reference tag hereinafter), which is a wireless device, that indicates a reference position at the user's destination. Furthermore, as a result of the RFID reader reading RFID tags for article management (article tags hereinafter), it is possible to manage the positions of the corresponding article tags.

Considering the convenience of managing and searching for articles, it is desired that the positions of article tags that are located away from the reference tag (positions where no readable reference tag is present) can be managed. Japanese Patent Laid-Open No. 2021-141415 discloses a technique for estimating the positions of article tags present in a wide range by calculating relative positions of the article tags detected by the RFID reader relative to the reference tag based on the amount of movement of the RFID reader from the location of the detected reference tag.

However, with an RFID tag position estimation method such as that in Japanese Patent Laid-Open No. 2021-141415, in a case where the state where the RFID reader cannot detect the reference tag continues, errors regarding the position of the RFID reader (movement amount) will accumulate significantly. As a result, there is a problem of an increase in error in the estimated position of the RFID tag to be managed.

SUMMARY

The present disclosure provides a technique for improving accuracy of position management performed using a communication apparatus having a function of communicating with a wireless device.

According to one embodiment of the present disclosure, there is provided a communication apparatus comprising: a first obtaining unit configured to obtain first position information by communicating with a wireless device serving as a reference for identifying a position, using a first communication function; a measuring unit configured to measure a positional relationship with an external apparatus based on communication with the external apparatus performed using a second communication function different from the first communication function; a second obtaining unit configured to obtain second position information based on the positional relationship measured by the measuring unit; and a selecting unit configured to select either the first position information or the second position information, as position information for position management of another wireless device with which communication is to be performed using the first communication function.

Further features of the present disclosure will become apparent from the following description of exemplary embodiments with reference to the attached drawings.

BRIEF DESCRIPTION OF THE DRAWINGS

FIGS. 2A, 2B, 2C, 2D-1, and 2D-2 are flowcharts illustrating operations of an RFID reader according to the first embodiment.

DESCRIPTION OF THE EMBODIMENTS

Figure 1:
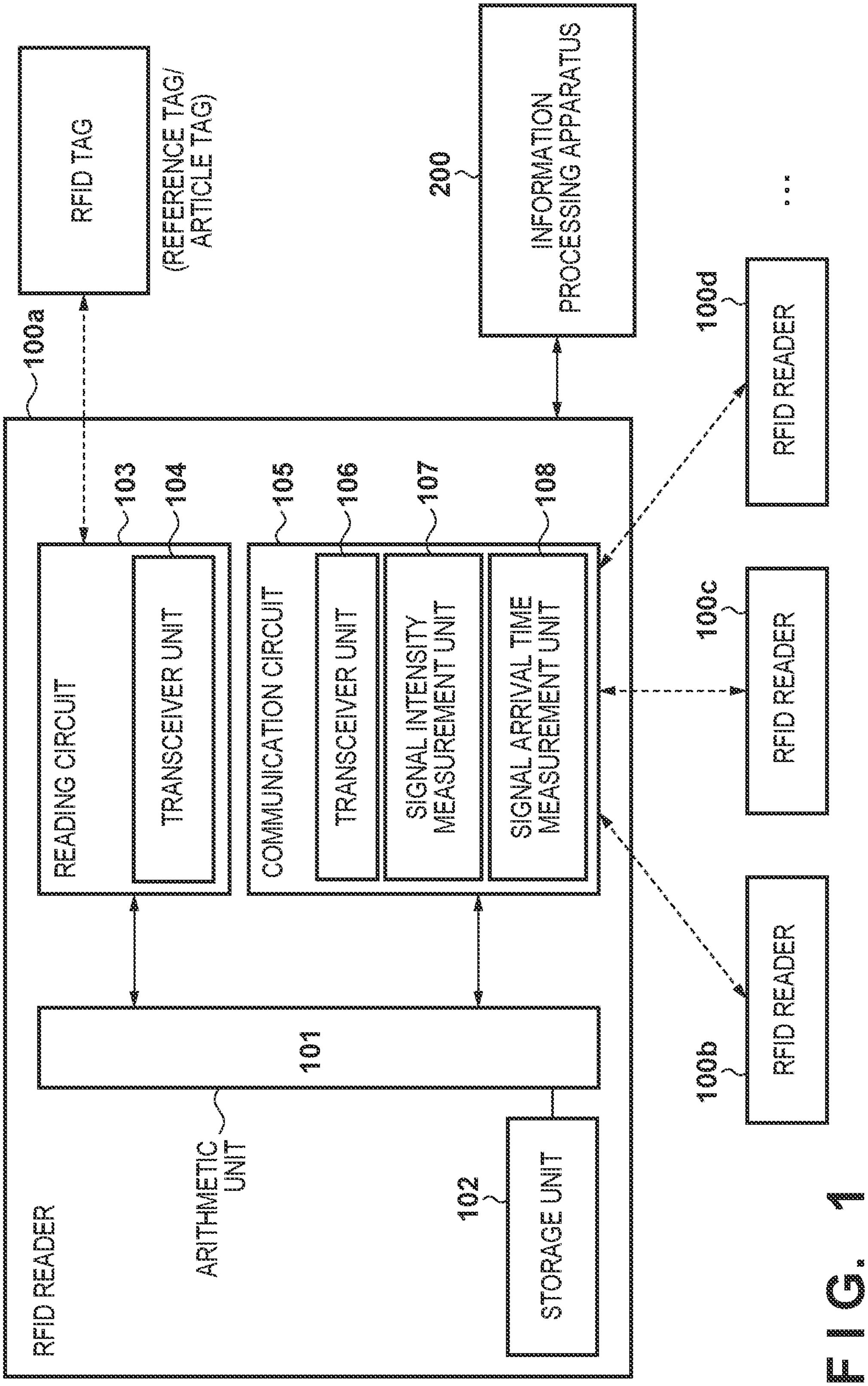
FIG. 1 is a block diagram showing a configuration example of a position management system according to a first embodiment.

Hereinafter, embodiments will be described in detail with reference to the attached drawings. Note, the following embodiments are not intended to limit the scope of the claimed invention. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

First Embodiment

Hereinafter, a position management system that manages position information regarding a wireless device to be managed will be described in detail. In the position management system according to this embodiment, wireless devices present in a wide range are detected by having a moving body such as a person or a machine carry the communication apparatus capable of detecting a wireless device. Here, the wireless device is an RFID tag, for example, and the communication apparatus is an RFID reader, for example. The following describes a position management system in which a portable RFID reader apparatus (referred to as the "RFID reader" hereinafter), an RFID tag that indicates a reference position (referred to as the "reference tag" hereinafter), and an RFID tag attached to an article (referred to as the "article tag" hereinafter) are used. The reference tag is an RFID tag whose position is known, and the article tag is an RFID tag whose position is unknown. The RFID reader according to the first embodiment is a communication apparatus having a first communication function for communicating with an RFID tag, and a second communication function for communicating with an external apparatus, the second communication function being different from the first communication function. This RFID reader has a first obtaining function for detecting a reference tag and obtaining its position, and also has a second obtaining function for obtaining its position based on communication with an external apparatus (e.g., another RFID reader). The position management system manages the position of an article to which the article tag is attached, based on positions obtained by the first obtaining function and the second obtaining function when the article tag is read.

FIG. 1 is a block diagram showing a configuration example of a position management system according to a first embodiment. The position management system includes RFID readers 100*a* to 100*d* (collectively referred to as the "RFID reader 100" hereinafter), an information processing apparatus 200, and a plurality of reference tags 301 that can be read by the RFID reader 100 using the first communication function. The RFID reader 100 and the information processing apparatus 200 are communicably connected to each other via wireless LAN such as WIFI, for example. The RFID reader 100 wirelessly reads information from the RFID tag using the first communication function. The RFID reader 100 operates an IC chip inside the RFID tag by supplying UHF band electromagnetic waves to the RFID tag, and reads reference position information and article management information stored in a storage unit of the RFID tag. The RFID reader 100 is carried by a moving body and thereby reads reference tags or article tags present in a wide range (a range exceeding the RFID communication range). The RFID reader 100 notifies the information processing apparatus 200 of position information obtained using the above described first obtaining function and second obtaining function, and article management information obtained by reading of an article tag. The information processing apparatus 200 manages the position of each article by associating position information and article management information with each other based on information of which the information processing apparatus 200 is notified by the RFID reader 100. Note that a configuration may be adopted in which the RFID reader 100 performs position management by associating position information and article management information with each other.

In the RFID reader 100, an arithmetic unit 101 includes one or more processors (processors hereinafter). The processors of the arithmetic unit 101 realize various types of control of the RFID reader 100 by executing programs stored in one or more memories (e.g., a storage unit 102). A reading circuit 103 that realizes the first communication function communicates with the RFID reader via a transceiver unit 104 under the control of the arithmetic unit 101, and reads the content of the RFID tag. Under the control of the arithmetic unit 101, a communication circuit 105 that realizes the second communication function communicates with other RFID readers via the transceiver unit 106 using a communication method provided with a distance measurement function, and measures the distances to the other RFID readers. The communication circuit 105 may be configured to be capable of communication using an ultra wide band (UWB) communication system or a Bluetooth communication system, for example.

A signal intensity measurement unit 107 measures the intensity of signals received by the transceiver unit 106. The arithmetic unit 101 obtains the distance between itself (the RFID reader 100) and another RFID reader, which is a communication partner, based on the received signal intensity measured by the signal intensity measurement unit 107. A signal arrival time measurement unit 108 measures the arrival time of signals received by the transceiver unit 106. The arithmetic unit 101 obtains the distance between itself (the RFID reader 100) and another RFID reader, which is a communication partner, based on the received signal arrival time measured by the signal arrival time measurement unit 108. More specifically, the signal arrival time measurement unit 108 measures the time taken from transmitting a first signal to the other RFID reader until receiving a second signal for responding to the first signal, and calculates the distance based on the measured time. In a case of UWB communication, the distance to the other RFID reader can be obtained based on the results of measurements made by the signal intensity measurement unit 107 or the signal arrival time measurement unit 108, for example. Also, in a case of Bluetooth communication, the distance to the other RFID reader can be obtained based on the results of measurements made by the signal intensity measurement unit 107, for example. Note that the distance measurement function of the second communication function is not limited to the above examples. Also, the RFID reader does not need to have both the signal intensity measurement unit 107 and the signal arrival time measurement unit 108, and in a case where the position management system uses the UWB communication system, it is sufficient that the signal arrival time measurement unit 108 is provided, for example.

An overview of position detection processing performed by the RFID reader 100 as described above is as follows. Although an overview of the position detection processing performed by an RFID reader 100*a* will be described below, other RFID readers 100*b* to 100*d* also execute similar position detection processing. First, an arithmetic unit 101 of the RFID reader 100*a* obtains, from the communication circuit 105, results of data communication with other RFID readers (e.g., the RFID readers 100*b* to 100*d*), and detects other RFID readers. In a case where a predetermined number of other RFID readers or more are detected, the arithmetic unit 101 makes the following inquiry to the other RFID readers through communication using the communication function of the communication circuit 105. Note that the three-point positioning method is used in this embodiment, and thus the predetermined number of other RFID readers is "3". First, the arithmetic unit 101 makes an inquiry about execution of communication with an RFID tag to the other detected RFID readers. Based on the result of this inquiry, the arithmetic unit 101 identifies three other RFID readers that have continued to read the reference tags for longer than a predetermined time and respectively read separate reference tags. Note that a configuration may be adopted in which, in a case where four or more RFID readers that read different reference tags have been detected, the arithmetic unit 101 identifies any three of the RFID readers or identifies three RFID readers that read reference tags closest to the RFID reader 100*a*. Note that a position indicated by the recently obtained position information may be used as the position of the RFID reader 100*a* at this time. Also, a configuration may be adopted in which, in a case where two or more RFID readers that read the same reference tag have been detected, the arithmetic unit 101 identifies any one of the RFID readers or identifies an RFID reader with the longest reading duration. Hereinafter, a description is given assuming that RFID readers 100*b* to 100*d* have been identified as three other RFID readers.

During collection periods (Ta to Tb), the arithmetic unit 101 requests the identified RFID readers 100*b* to 100*d* to execute measurement of the distance between the RFID readers 100*b* to 100*d*, and transmit the result of distance measurement, using the communication function of the communication circuit 105. The RFID readers 100*b* to 100*d* that have received this request measure the distance therebetween using the distance measurement function of the communication circuit 105, and transmit the results of the distance measurement to the RFID reader 100. The arithmetic unit 101 receives the result of distance measurements from the three RFID readers 100*b* to 100*d* using the communication function of the communication circuit 105, and collects the distance measurement results for each RFID reader received in the collection period. The arithmetic unit 101 collects the distance measurement results, and then determines whether the range between the upper and lower limits ("upper/lower limit range" hereinafter) of the distance measurement results collected for each RFID reader is within a threshold. In a case where the arithmetic unit 101 has determined that the upper/lower limit range of the collected results of the distances measured by the three RFID readers, the distances between the three RFID readers are measured using the distance measurement function of the communication circuit 105. Also, the arithmetic unit 101 calculates position information of the RFID reader 100 using the three-point positioning method on the distance measurement results. At this time, the positions of the three RFID readers may be determined based on the position of the reference tags read by the RFID readers.

Position obtaining processing performed by the RFID reader 100 according to the first embodiment described above will be described in detail using flowcharts shown in FIGS. 2A to 2D. This processing may be realized as a result of the arithmetic unit 101 of the RFID reader 100 executing a program stored in the storage unit 102 in response to the power source of the RFID reader 100 being turned ON, for example.

Figure 2A:
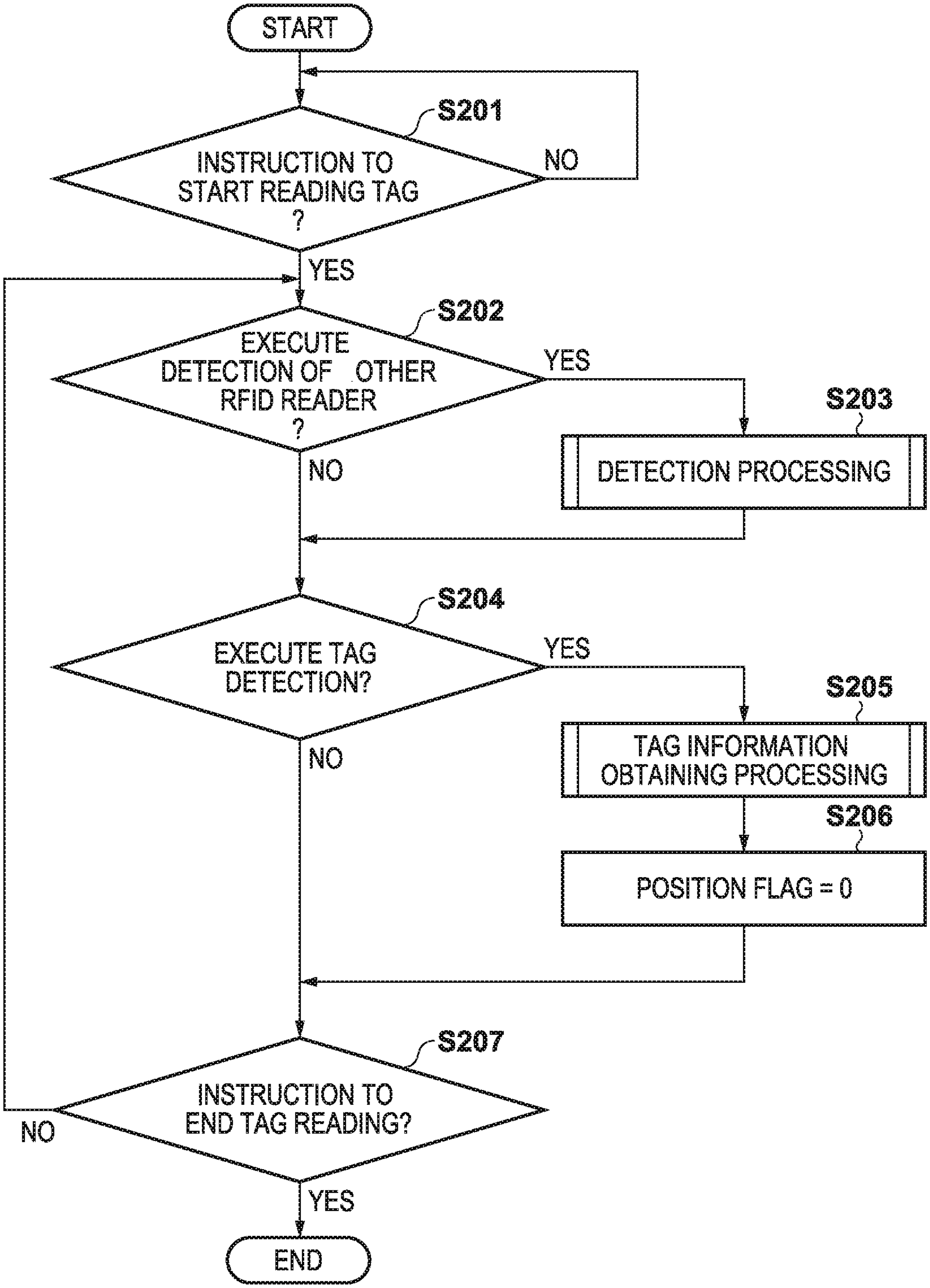

When the power source is turned ON, the RFID reader 100 starts processing (main flow) shown in FIG. 2A. In step S201, the RFID reader 100 (the arithmetic unit 101) determines whether or not an RFID tag reading start instruction is given by a user. The reading start instruction given by the user may be accepted through a predetermined operation made using an input unit (not shown), for example. The input unit may be realized by a touch panel, for example. Alternatively, the RFID tag reading start instruction may be received from the information processing apparatus 200, and accepted. When the RFID tag reading start instruction has been accepted (YES in step S201), the processing proceeds to step S202. In the processing in step S202 onward, the arithmetic unit 101 periodically operates the communication circuit 105 in order to perform communication with other RFID readers, and periodically operates the reading circuit 103 in order to perform communication with an RFID tag. In a case where the RFID tag reading start instruction has not been given, the processing returns to step S201. Note that in the processing in step S202 onward shown in FIG. 2, detection of other RFID readers (detection processing (step S203)) and detection of RFID tags (tag information obtaining processing (step S205)) are executed at respective timings (timings at which YES is obtained in step S202 and step S204). That is, the detection processing (step S203) and tag information obtaining processing (step S205) are not synchronized. However, the present invention is not limited to this, and a configuration may be adopted in which the detection processing (step S203) and the tag information obtaining processing (step S205) are synchronized and periodically executed. In this case, the processing in steps S203, S205, and S206 will be successively executed depending on whether or not it is time to execute the detection processing and the tag information obtaining processing in step S202 for example.

In step S202, the arithmetic unit 101 determines whether or not it is time to execute detection of other RFID readers, using the communication function of the communication circuit 105. In a case where it is time to execute detection of other RFID readers (YES in step S202), the processing proceeds to step S203, and detection processing (FIG. 2B) is executed. On the other hand, in a case where it is determined that it is not time to execute detection of other RFID readers (NO in step S202), the processing proceeds to step S204.

Figure 2B:
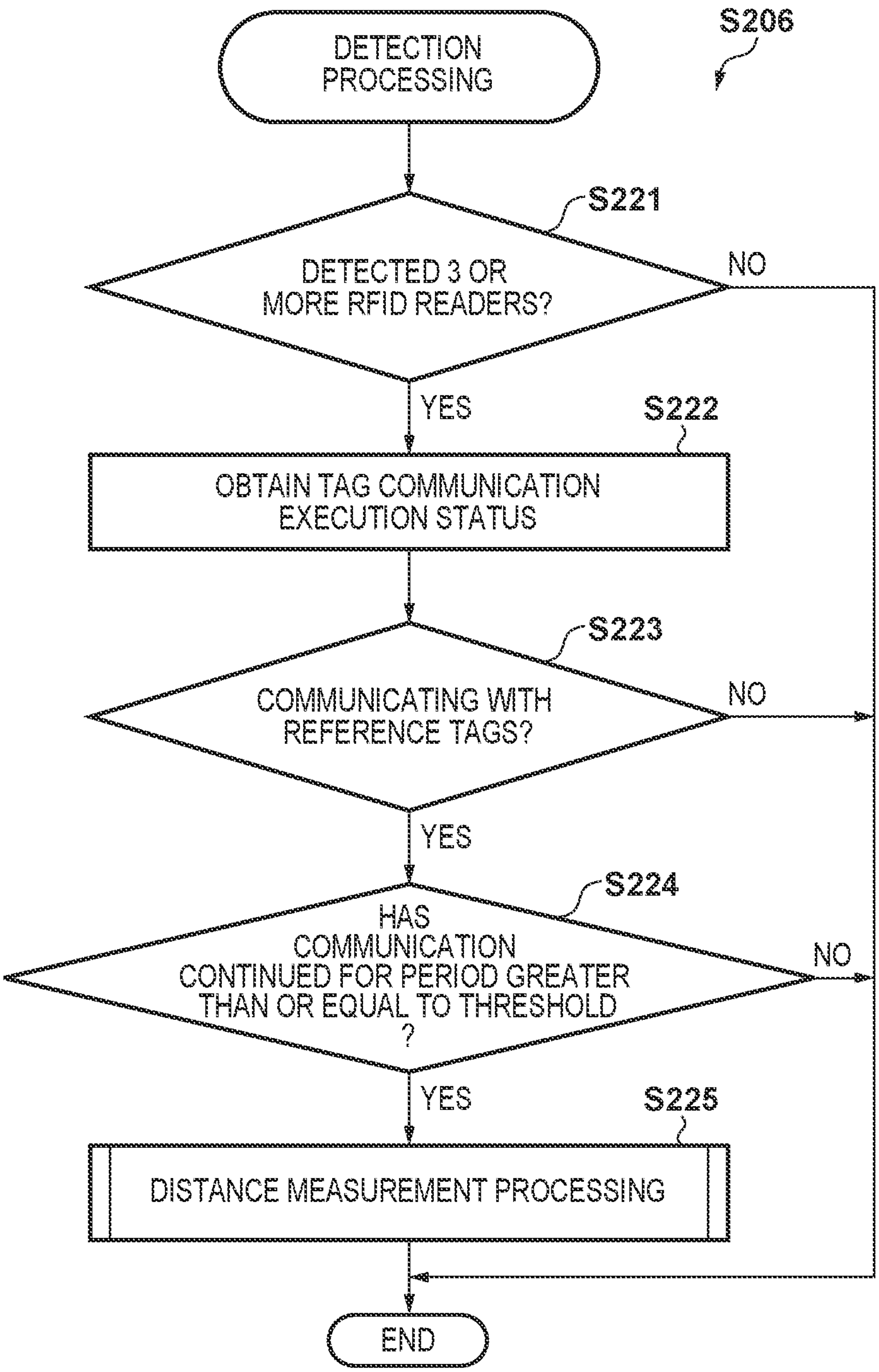

The detection processing executed in step S203 will be described with reference to the flowchart shown in FIG. 2B. First, in step S221, the arithmetic unit 101 determines whether or not three or more RFID readers are detected using the communication function of the communication circuit 105. In a case where three or more other RFID readers have been detected (YES in step S221), the processing proceeds to step S222. On the other hand, in a case where three or more other RFID readers are not detected (NO in step S221), the detection processing (Step S203) ends, and the processing proceeds to step S204 shown in FIG. 2A.

In step S222, the arithmetic unit 101 makes an inquiry about execution status of communication with a reference tag to the other detected RFID readers, using the communication function of the communication circuit 105. Here, the arithmetic unit 101 makes an inquiry about, as the execution status of communication, whether or not communication with a reference tag is executed and the duration of communication with the reference tag. The other RFID readers respond to this inquiry using the communication function of the communication circuit 105, and notify the RFID reader 100 of the execution status of communication with the reference tag.

In step S223, the arithmetic unit 101 determines whether or not three or more other RFID readers communicate with different reference tags, based on the responses from the other RFID readers. In a case where there are three or more other RFID readers, which are communicating with different reference tags (YES in step S223), the processing proceeds to step S224. On the other hand, in a case where there are two or less other RFID readers, which are communicating with separate reference tags (NO in step S223), the detection processing ends (the processing proceeds to step S204 shown in FIG. 2A). In step S224, the RFID reader 100 determines whether or not, as for the other RFID readers, which execute communication with the reference tags, the period of communication with a reference tag has continued for the threshold or longer. In a case where there are three or more other RFID readers, which have been communicating with different reference tags for a period that is equal to or longer than the threshold (YES in step S224), the processing proceeds to step S225, and the distance measurement processing (FIG. 2C) is executed. On the other hand, in a case where there are two or less other RFID readers whose duration of communication with different reference tags is equal to or longer than the threshold (NO in step S224), the detection processing ends, and the processing proceeds to step S204 (FIG. 2A). Based on the above detection processing, in a case where three or more other RFID readers have been communicating with three or more different reference tags for a duration, which exceeds the threshold, the distance measurement processing will be executed.

Figure 2C:
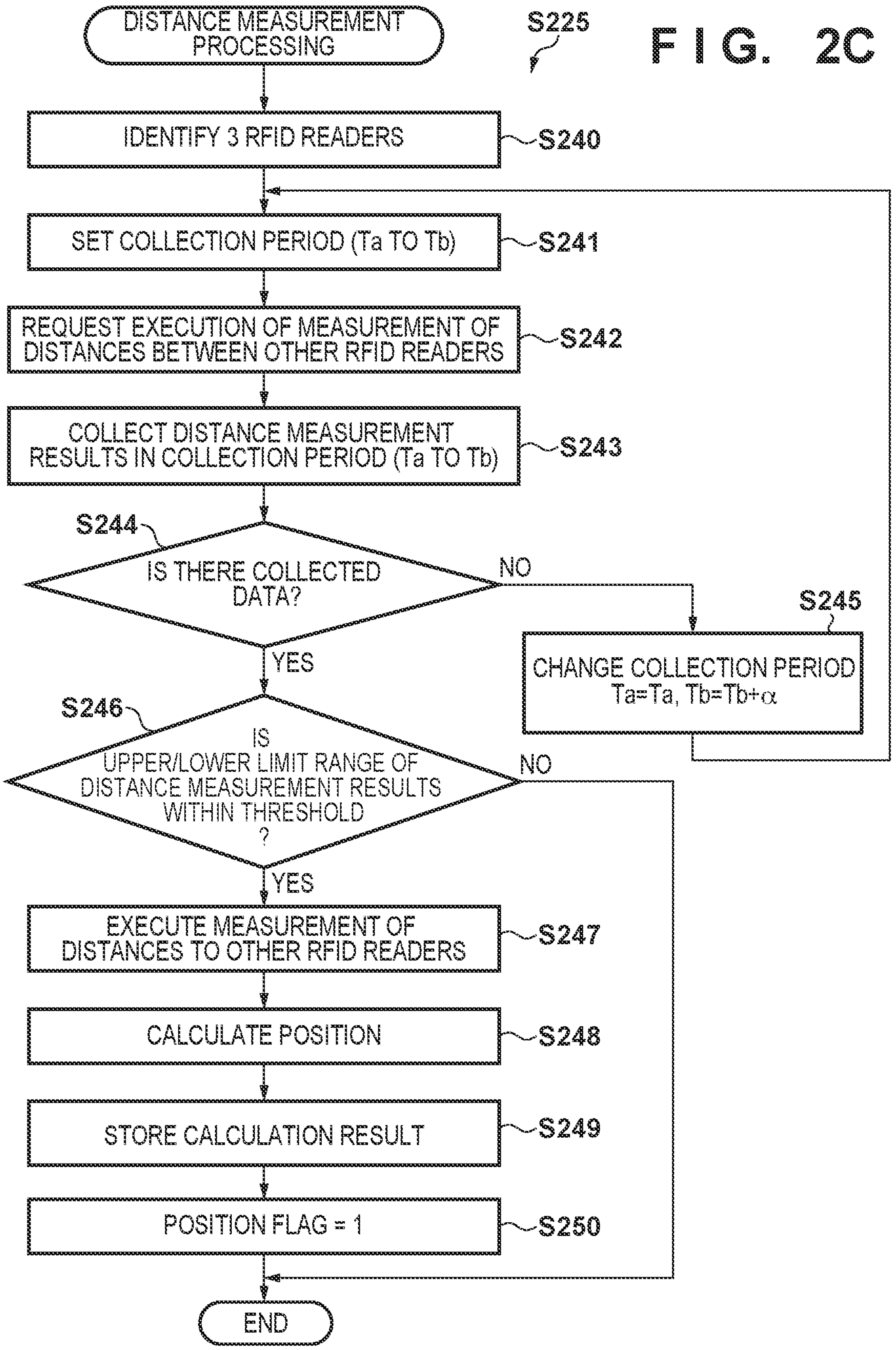

The distance measurement processing executed in step S225 will be described with reference to the flowchart shown in FIG. 2C. In step S240, from the three or more other RFID readers that have been identified in the above detection processing (FIG. 2B) and whose period of communication with the reference tags has continued for the threshold or longer, the arithmetic unit 101 identifies three RFID readers that are to be communicated with in the distance measurement processing. The arithmetic unit 101 identifies three RFID readers that are reading different reference tags by preferentially selecting RFID readers, which are reading a reference tag located close to the RFID reader 100*a*, for example. Also, in a case where two or more RFID readers that read the same reference tag have been detected, the arithmetic unit 101 preferentially selects an RFID reader that reads the reference tag for a long duration.

In step S241, the arithmetic unit 101 sets a period for collecting the results of distance measurement among the three identified RFID readers (referred to as the "collection period" hereinafter). Here, it is presumed that a period from time Ta to time Tb is set as a collection period. In step S242, the arithmetic unit 101 requests execution of measurement of distances between the three identified RFID readers and transmission of the distance measurement results, using the communication function of the communication circuit 105. The other RFID readers that have received this request execute measurement of the distances between the selected other RFID readers using the distance measurement functions of their communication circuits 105, and transmit the distance measurement results to the RFID reader 100 using the communication functions of the communication circuits 105. In step S243, the arithmetic unit 101 collects the distance measurement results for each RFID reader received from other RFID readers in the collection period, using the communication function of the communication circuit 105. In step S244, the arithmetic unit 101 determines whether or not data has been collected from all of the identified RFID readers. In a case where collected data has been obtained (YES in step S244), the processing proceeds to step S246, whereas in a case where collected data cannot be obtained (NO in step S244), the processing proceeds to step S245. In step S245, the arithmetic unit 101 changes the collection period to a longer collection period. The collection period is extended by delaying time Tb by α while leaving the time Ta unchanged, for example. Thereafter, the processing returns to step S241, and the above-described processing (from step S241 to step S244) is repeated.

In step S246, the arithmetic unit 101 determines whether or not the upper/lower limit range of the distance measurement results collected for each RFID reader is within the threshold (i.e., whether or not a variation in the distance obtained through distance measurement during the collection period is within the threshold). In a case where the upper/lower limit range of the distance measurement results obtained from the three identified RFID readers is within the threshold (YES in step S246), the processing proceeds to step S247. In a case where there are two or less other RFID readers for which the upper/lower limit range of the distance measurement results is within the threshold (NO in step S246), the distance measurement processing ends (the processing proceeds to step S103 shown in FIG. 2A). Note that, in a case where four or more RFID readers are detected in the detection processing, the combination of the three RFID readers identified in step S240 may be changed, and the processing from step S241 onward may be repeated.

In step S247, the arithmetic unit 101 executes the measurement of the distances to the three identified RFID readers, using the distance measurement function of the communication circuit 105. In step S248, the arithmetic unit 101 calculates information regarding a position corresponding to the position of the RFID reader 100 using the three-point positioning method, based on the distance measurement results obtained in step S247 and the positions of the reference tags with which the three identified RFID readers are communicating. Note that information regarding the reference tags read by the other RFID readers can be obtained through communication using the communication circuit 105. Also, a configuration may be adopted in which position information is received from the other RFID readers, instead of the information regarding the reference tags. In step S249, the RFID reader 100 stores the position information calculated in step S248 in the storage unit 102. In step S250, the arithmetic unit 101 performs flag processing (a position flag is set to 1) indicating that the position information has been calculated using another RFID reader as a reference, and the distance measurement processing ends.

Returning to FIG. 2A, in step S204, the RFID reader 100 determines whether or not it is time to execute detection of an RFID tag (a reference tag or an article tag). In a case where it is time to execute detection of an RFID tag (YES in step S204), the processing proceeds to step S205, and tag information obtaining processing is executed. On the other hand, in a case where it is determined that it is not time to execute detection of an RFID tag (NO in step S204), the processing proceeds to step S207.

Figures 1, 2D:
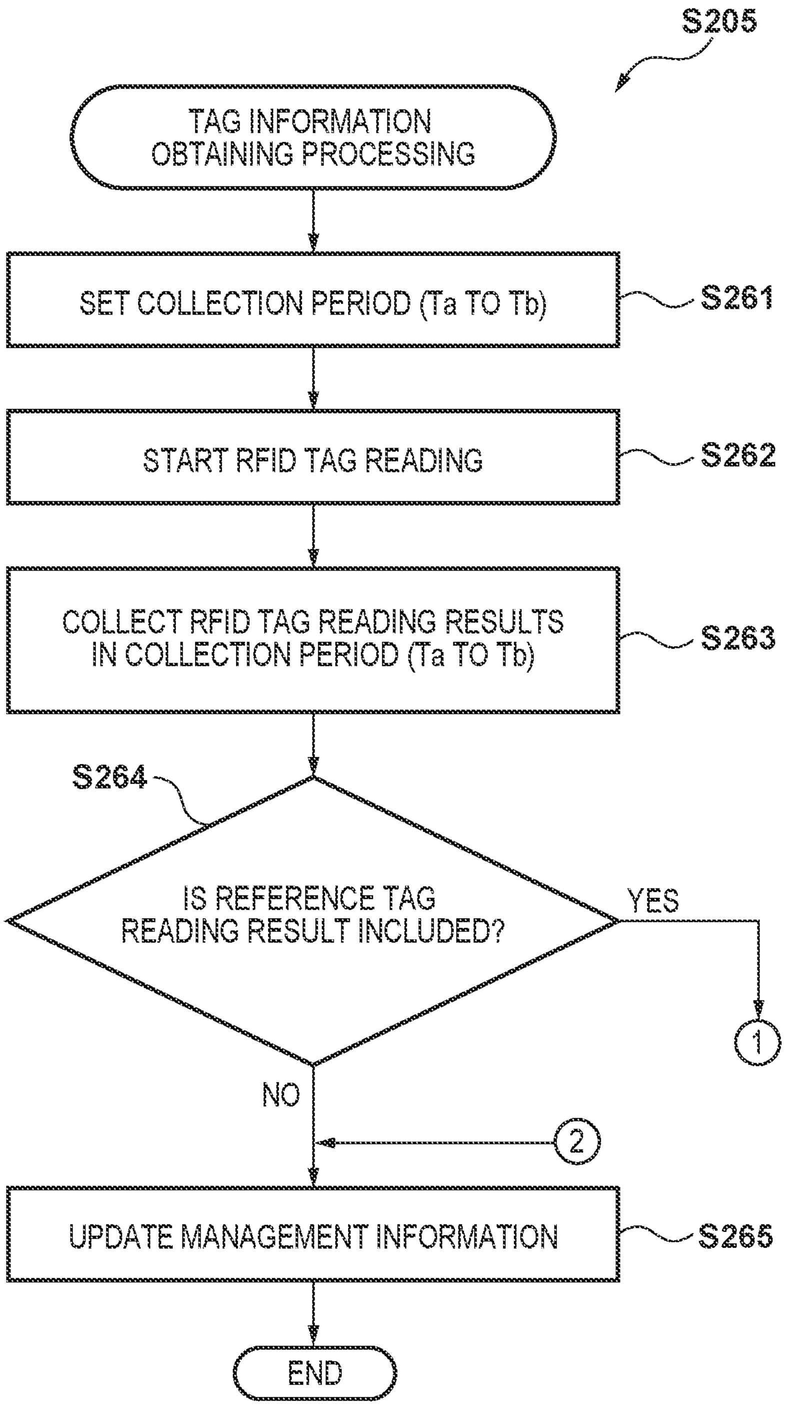
Figures 2, 2D:
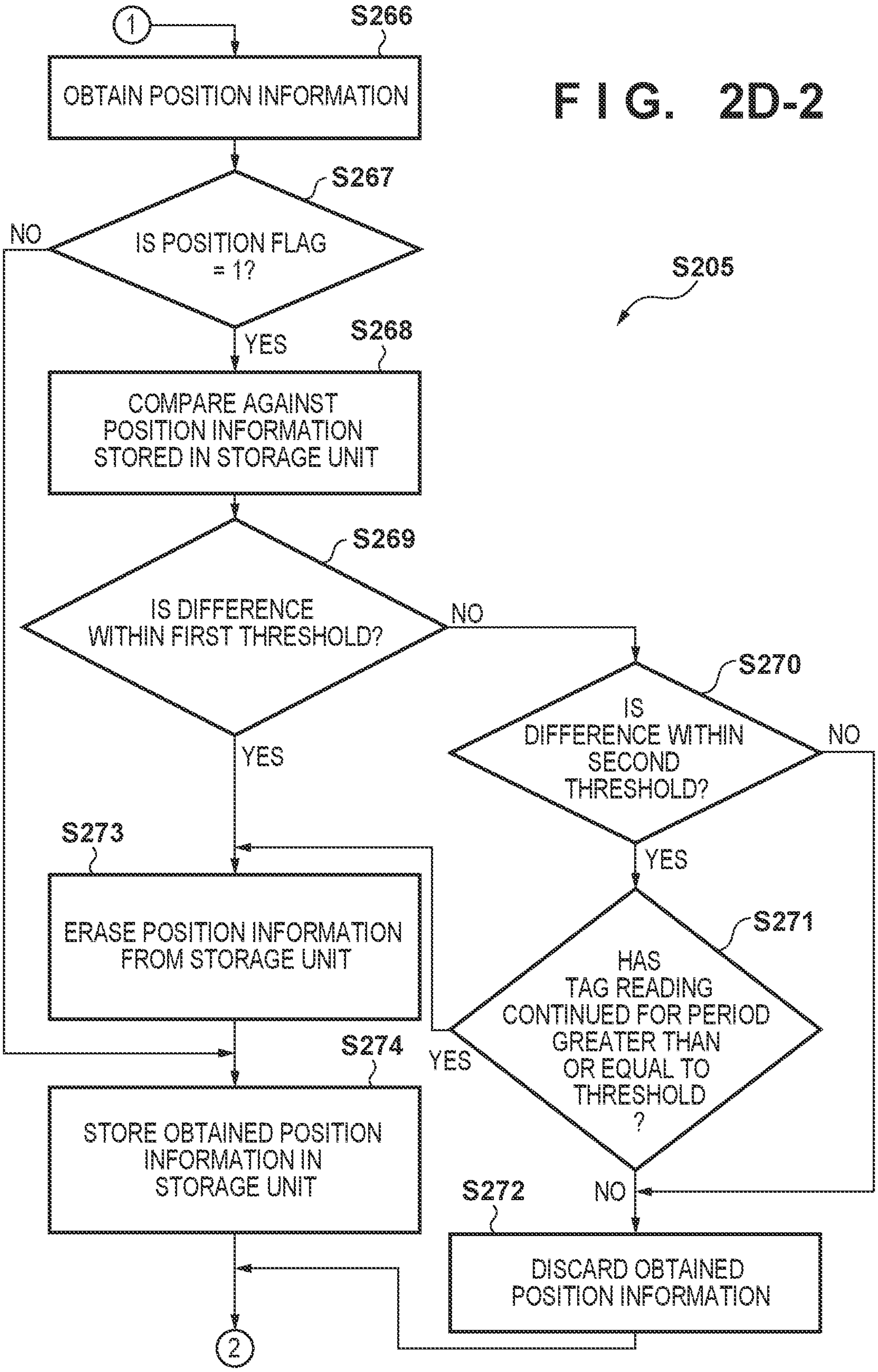

The tag information obtaining processing executed in step S205 will be described with reference to the flowchart shown in FIGS. 2D-1 and 2D-2. In step S261, the arithmetic unit 101 sets a period for collecting the RFID tag reading results (referred to as the "collection period" hereinafter). Here, it is presumed that a period from time Ta to time Tb is set as a collection period (note that time Ta and time Tb are set independently of Ta and Tb set in step S241). In step S262, the arithmetic unit 101 starts reading the RFID tags. In step S263, the arithmetic unit 101 collects the RFID tag reading results in the collection period. In step S264, the arithmetic unit 101 determines whether or not the RFID tag reading results collected in step S263 include a reference tag reading result. When the RFID tag reading results include the reference tag reading result (YES in step S264), the processing proceeds to step S266. On the other hand, when the RFID tag reading results do not include the reference tag reading result (in a case where no RFID tag is read, or in a case where no article tag is read (NO in step S264)), the processing proceeds to step S265.

In step S266, the arithmetic unit 101 obtains information regarding a position corresponding to the position of the RFID reader 100 from the reference tag reading result. In step S267, the arithmetic unit 101 determines whether or not position information calculated using the other RFID reader as a reference is provided, based on the state of a position flag (which is set in the above-described distance measurement processing (step S250)). When the position flag is equal to 1 (YES in step S267), the arithmetic unit 101 determines that position information calculated using the other RFID reader as a reference is provided, and the processing proceeds to step S268. When the position flag is not equal to 1 (NO in step S267), the arithmetic unit 101 determines that position information calculated using the other RFID reader as a reference is not provided, and the processing proceeds to step S274. In step S274, the arithmetic unit 101 stores the position information obtained in step S266 in the storage unit 102.

In step S268 onward, depending on whether predetermined conditions are met (step S269 to step S271), it is determined whether position information obtained based on communication with the other RFID reader or position information obtained based on communication with the reference tag is used. In step S268, the arithmetic unit 101 compares the position information obtained in step S266 with the position information stored (step S249) in the storage unit 102 through the distance measurement processing. In step S269, as a result of the comparison performed in step S268, the arithmetic unit 101 determines whether or not the difference between the position information obtained in step S266 and the position information stored in the storage unit 102 is within a first threshold. In a case where the difference is within the first threshold (YES in step S269), the processing proceeds to step S273, whereas in a case where the difference is not within the first threshold (NO in step S269), the processing proceeds to step S270.

In step S270, as a result of the comparison performed in step S268, the arithmetic unit 101 determines whether or not the difference between the position information obtained in step S266 and the position information stored in the storage unit 102 is within a second threshold. In a case where the difference is within the second threshold (YES in step S270), the processing proceeds to step S271, whereas in a case where the difference is not within the second threshold (NO in step S270), the processing proceeds to step S272. In step S271, the arithmetic unit 101 determines whether or not the period for which the reading circuit 103 is communicating with the reference tag has continued for a threshold or longer. In a case where the period of communication with the reference tag difference has continued for the threshold or longer (YES in step S271), the processing proceeds to step S273, whereas in a case where the period of communication with the reference tag has not continued for the threshold or longer (NO in step S271), the processing proceeds to step S272. In step S272, the arithmetic unit 101 discards the position information obtained in step S266. On the other hand, when the processing proceeds to step S273, the position information stored in the storage unit 102 is updated with the position information obtained in step S266. That is, in step S273, the arithmetic unit 101 erases, from the storage unit 102, the position information (step S249) obtained based on communication with the other RFID, and in step S274, the arithmetic unit 101 stores the position information (step S266) obtained based on reading of the reference tag in the storage unit 102. In step S265, the arithmetic unit 101 updates management information. The management information is information for performing position management by associating the position of the RFID reader with an article. In step S265, the arithmetic unit 101 updates position information of the RFID reader in the management information, with newly determined position information. Also, in a case where the RFID tag read in step S262 includes an article tag, management information for managing the position of the article is updated by associating article management information indicated by the article tag with the updated position information. The information processing apparatus 200 may be notified of management information at the timing of the update performed in step S265, or may be notified thereof at any timing other than the timing of the update.

Returning to FIG. 2A, in step S206, the arithmetic unit 101 initializes a position flag (the position flag is set to 0) indicating that the position information calculated using the other RFID reader as a reference is provided. In step S207, the arithmetic unit 101 determines whether or not an RFID tag reading end instruction is given by a user. In a case where the RFID tag reading end instruction is given by a user (YES in step S207), the operation of the reading circuit 103 is stopped, and communication with the RFID tag is stopped. On the other hand, in a case where the end instruction is not given (NO in step S207), the processing returns to step S102, and the above-described processing continues. With the above processing, first position information is obtained by reading the reference tag (step S266), and second position information (step S248) is obtained by measuring the distances to the other RFID readers. In a case where the first position information and the second position information are obtained, position information to be used for position management is selected based on a positional relationship indicated by these pieces of position information (step S268 to step S274). Also, in a case where one of the first position information and the second position information is obtained, the obtained position information is selected as position information to be used for position management.

Figure 3A:
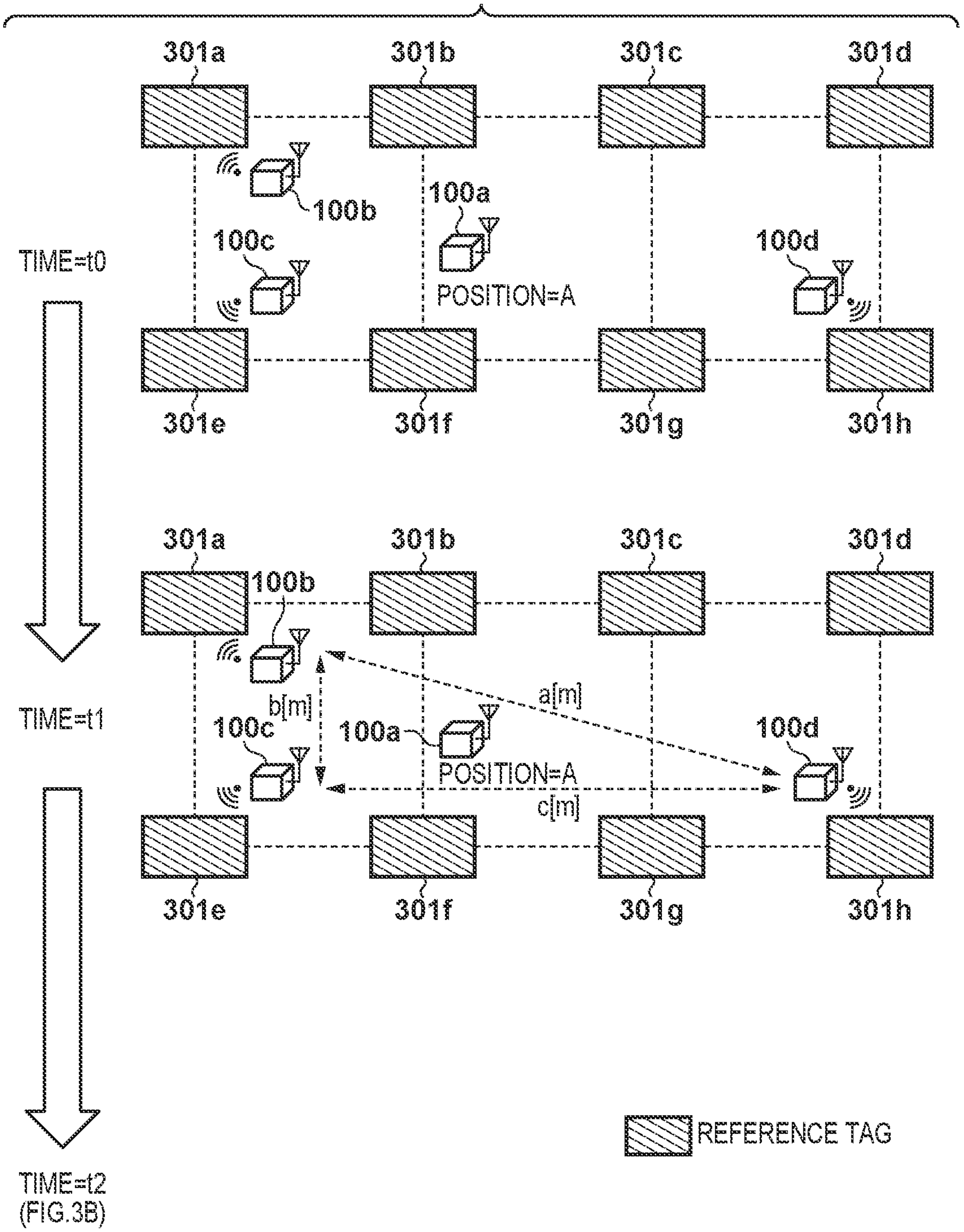
FIGS. 3A and 3B are diagrams showing an operation example of the RFID reader according to the first embodiment.
Figure 3B:
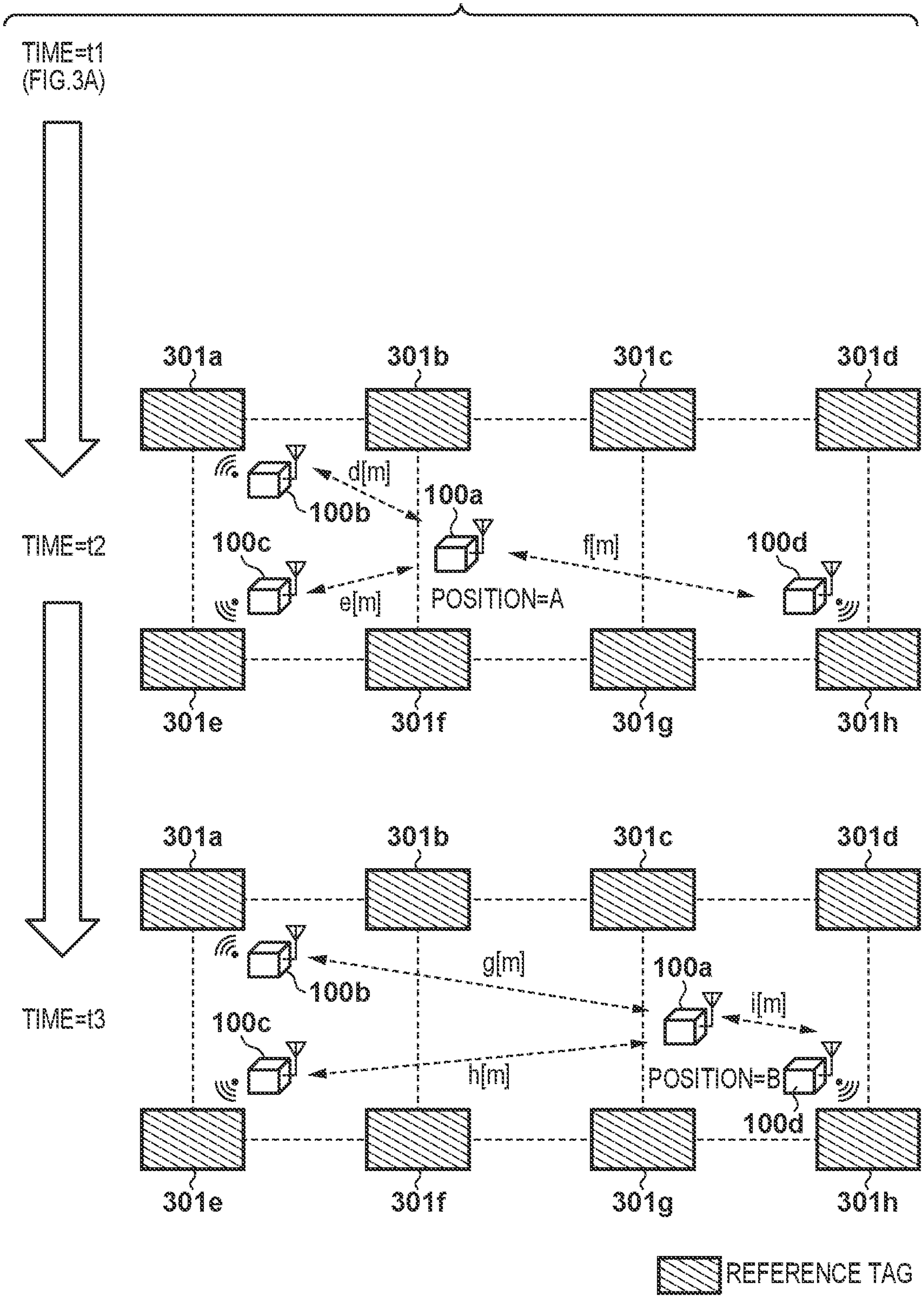

An example of operation performed in the processing described above using the flowcharts shown in FIGS. 2A to 2D will be further described using FIGS. 3A and 3B. FIGS. 3A and 3B are diagrams illustrating an operation example of the RFID reader 100 according to the first embodiment. In this example, there are four RFID readers 100*a* to 100*d*. Also, reference tags 301*a* to 301*h* are arranged as RFID tags indicating reference positions. Hereinafter, the RFID readers 100*a* to 100*d* may be collectively referred to as the "RFID reader 100", and the reference tags 301*a* to 301*h* may be collectively referred to as the "reference tag 301". The reference tag 301 is an RFID tag arranged to detect a reference position, and is attached to the floor or the like, for example, and the arrangement position is fixed. Also, as shown in FIGS. 3A and 3B, a control system according to the first embodiment will be described below, assuming a situation where the RFID reader 100*a* moves from a position A to a position B.

In the example shown in FIGS. 3A and 3B, the RFID reader 100*a* detects other RFID readers and detects the RFID tags through ultra wide band (UWB) communication. At time t0, the RFID reader 100*a* detects the other RFID readers 100*b* to 100*d*, and makes an inquiry about the execution status of communication with the reference tags (step S222 to step S224). As a result of this inquiry, the RFID reader 100*a* determines that the periods for which the RFID readers 100*b*, 100*c*, and 100*d* are respectively communicating with the reference tags 301*a*, 301*e*, and 301*h* have each continued for the threshold or longer. In this case, the RFID reader 100 sets a period from time Ta to time Tb as a period for collecting the results of measurement of the distances between RFID readers 100*b* to 100*d* (referred to as the "collection period" hereinafter) (step S241). Then, the RFID reader 100*a* requests the RFID readers 100*b* to 100*d* using UWB communication so as to measure mutual distances between the RFID readers 100*b* to 100*d* (step S242). In this example, execution of measurement of a mutual distance b between the RFID reader 100*b* and the RFID reader 100*c*, a distance c between the RFID reader 100*c* and the RFID reader 100*d*, and a distance a between the RFID reader 100*d* and the RFID reader 100*b* is required. That is, the RFID reader 100*a* requests the RFID reader 100*b* to measure the distance a and the distance b, requests the RFID reader 100*c* to measure the distance b and the distance c, and requests the RFID reader 100*d* to measure the distance a and the distance c. The RFID readers 100*b* to 100*d* each execute the measurement of the distances a to c using UWB communication at time t1, and transmit the distance measurement results to the RFID reader 100*a* using UWB communication. The RFID reader 100*a* receives the results of measurement of the distances a to c from the RFID readers 100*b* to 100*d*, and perform collection in the collection period Ta to Tb (step S243).

The RFID reader 100 determines whether or not the upper/lower limit range obtained for the distance measurement results of the distances a, b, and c collected in the collection period Ta to Tb is within a threshold (step S246). In a case where it is determined that the upper/lower limit range of the results obtained by measuring the distances a, b, and c is within the threshold, the RFID reader 100*a* measures the distances between the RFID reader 100*a* and other RFID readers 100*b* to 100*d*, using UWB communication at time t2 (FIG. 3B) (step S247). Specifically, the RFID reader 100*a* executes measurement of the distance d between the RFID reader 100*a* and the RFID reader 100*b*, the distance e between the RFID reader 100*a* and the RFID reader 100*c*, and the distance f between the RFID reader 100*a* and the RFID reader 100*d*. Also, the arithmetic unit 101 calculates a position A through position calculation using the three-point positioning method based on the positions of the reference tags 301*a*, 301*e*, and 301*h* with which the RFID readers 100*b* to 100*d* are communicating, and the obtained results of measurement of the distances d to f (step S248). By continuing periodic execution of the above operation, the RFID reader 100*a* that has moved to a position B executes measurement of a distance i at time t3. A distance g refers to the distance between the RFID reader 100*a* and the RFID reader 100*b*, a distance h refers to the distance between the RFID reader 100*a* and the RFID reader 100*c*, and the distance i refers to the distance between the RFID reader 100*a* and the RFID reader 100*d*. The RFID reader 100*a* performs position calculation using the three-point positioning method based on the obtained results of measurement of the distances g to i, and the positions of the reference tags 301*a*, 301*e*, and 301*h*. As a result, the RFID reader 100*a* can calculate the position B even if the reference tag cannot be detected.

As described above, according to the first embodiment, in a management system in which portable RFID readers, reference tags, and article tags are used, even though the state where no reference tag can be read continues, the RFID reader can obtain position information through communication with other RFID readers. As a result, even in a situation where the reference tag cannot be read, it is possible to update information in real time to deal with changes in the location of an article over time, making it possible to improve the traceability of an article, compared to a conventional technique.

Second Embodiment

In the first embodiment, in a case where the position based on the detection of the reference tag 301 and the position based on communication with the other RFID readers are obtained, which position to use as the position of the RFID reader 100 was determined by comparing both positions. In a second embodiment, in a case where the RFID reader 100 is able to communicate with the reference tag 301, position information is obtained from the reference tag 301, and in a case where the RFID reader 100 is unable to communicate with the reference tag 201, position information is obtained based on communication with the other RFID readers. That is, the second embodiment differs from the first embodiment in that position information obtained based on the reference tag 201 is preferentially used, and a position calculation method is switched depending on the state of communication with the reference tag 201.

Figure 4A:
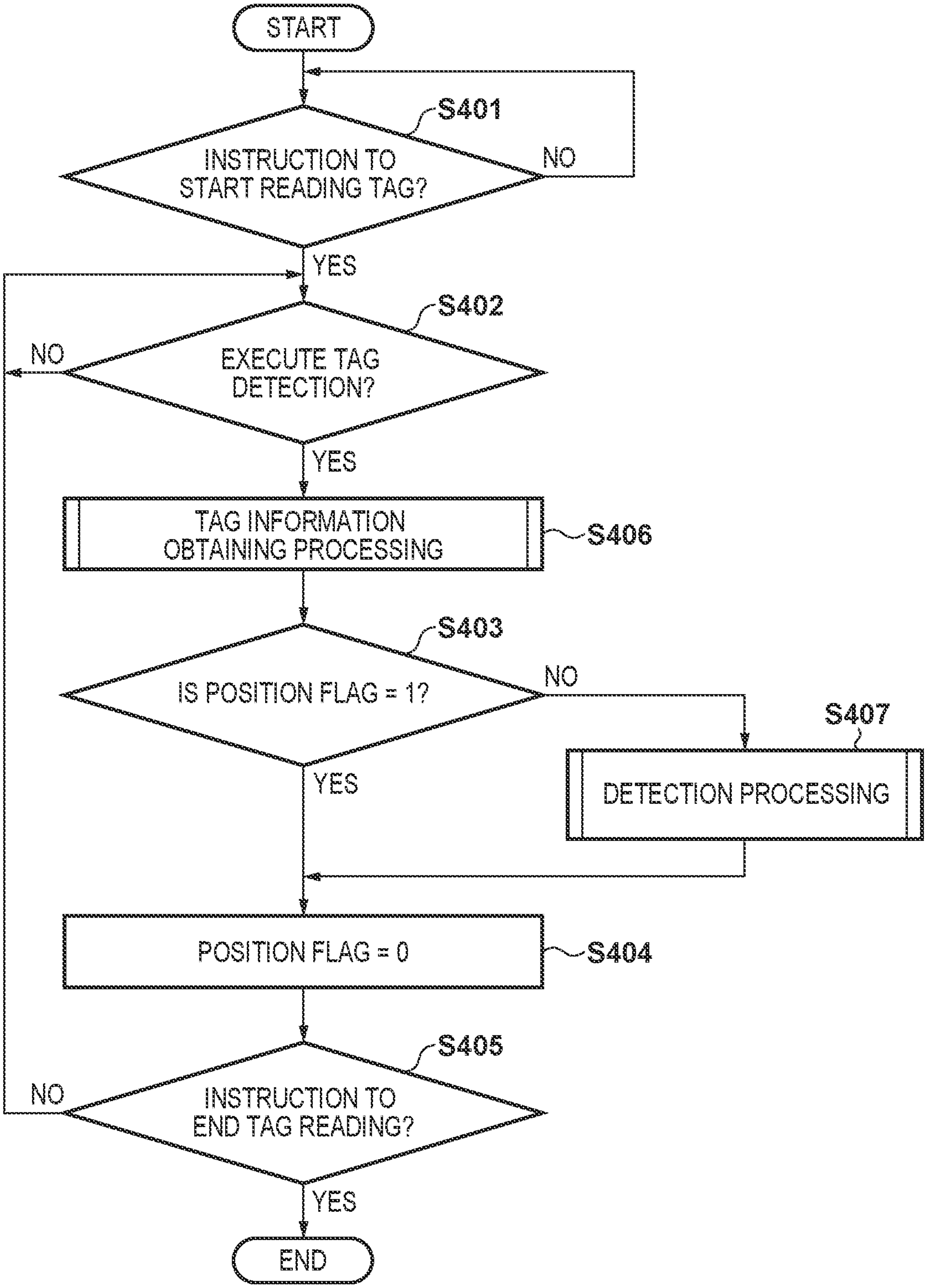
FIGS. 4A to 4C are flowcharts illustrating operations of an RFID reader according to a second embodiment.
Figure 4B:
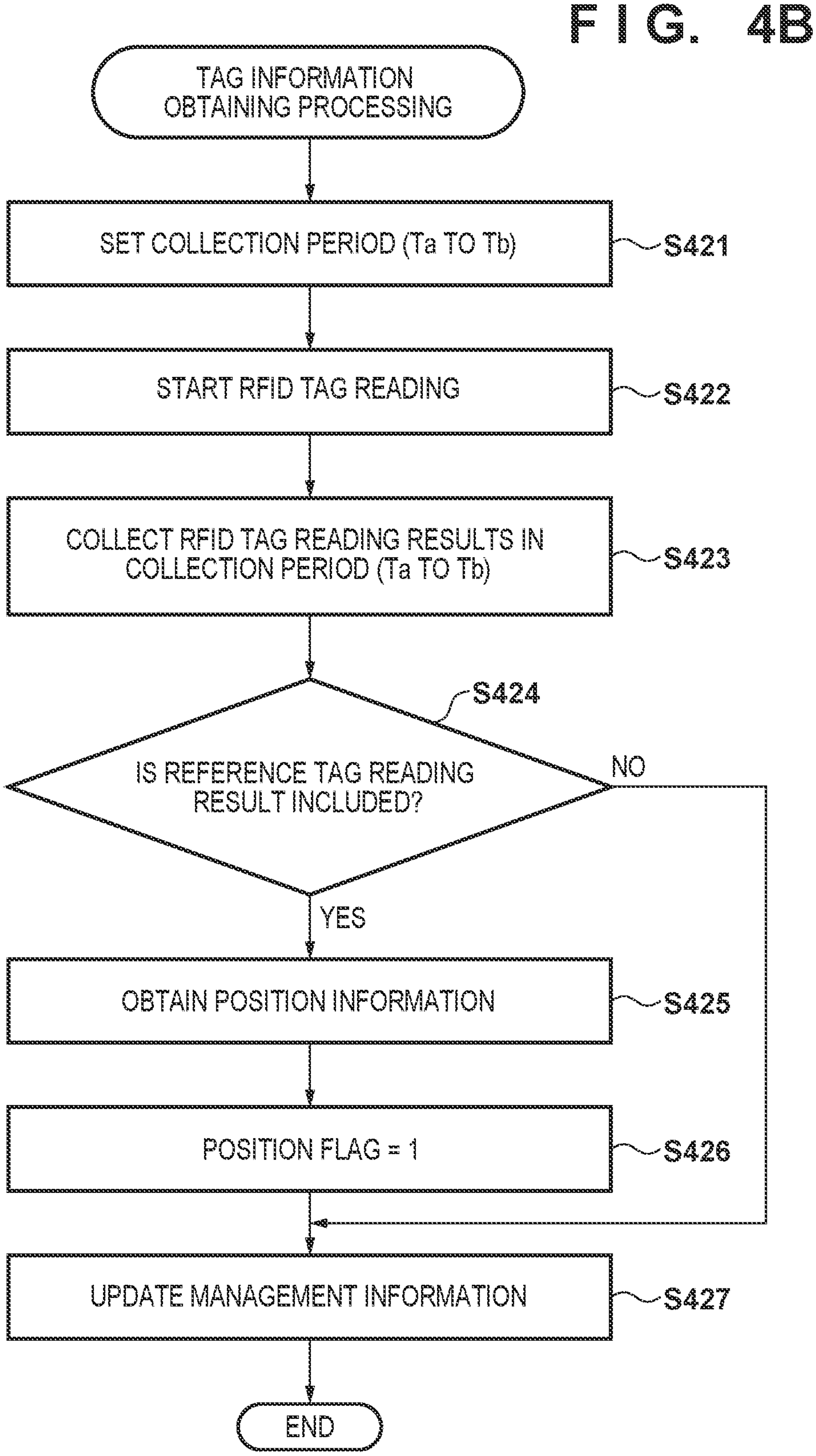
Figure 4C:
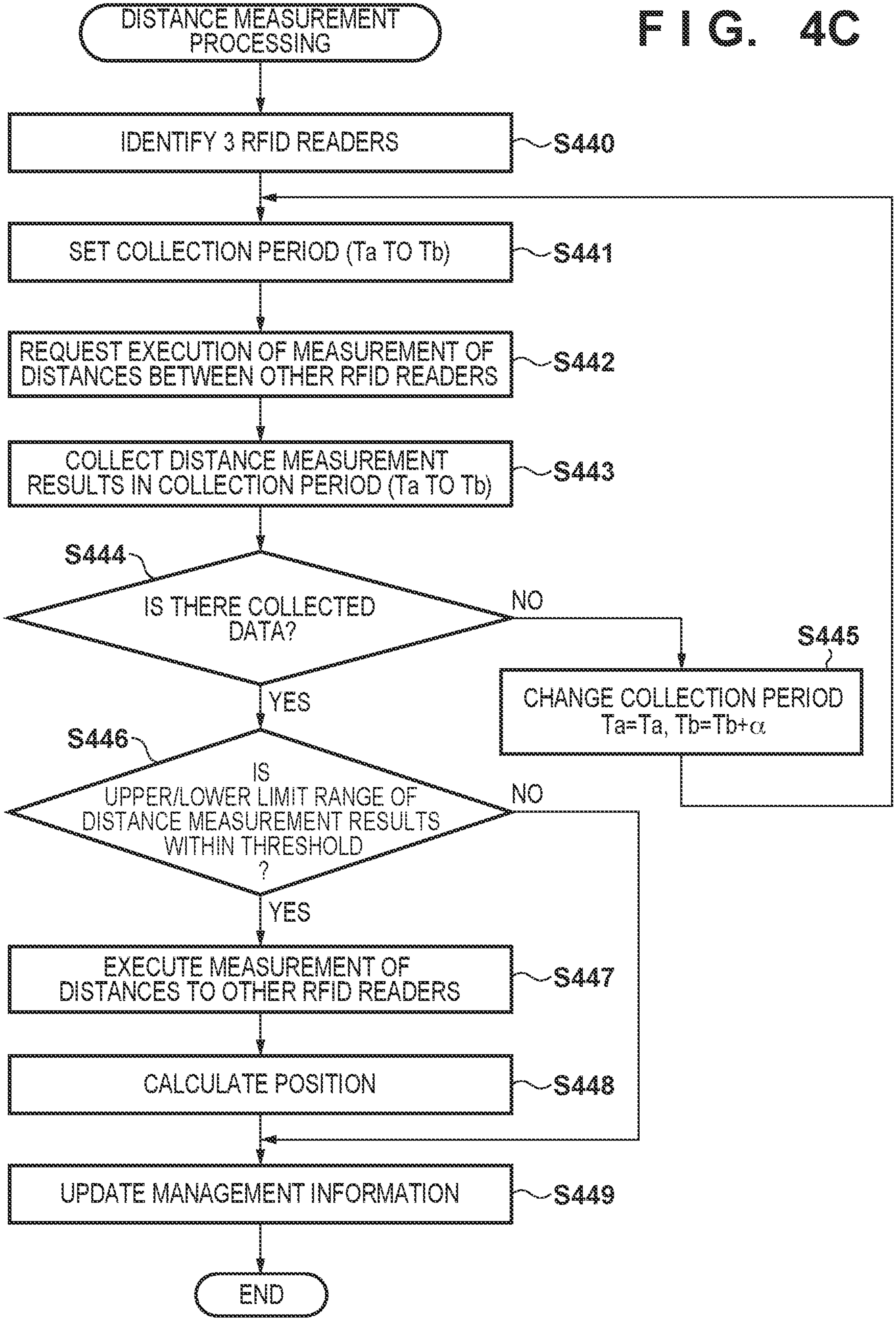

FIGS. 4A to 4C are flowcharts illustrating operations of the RFID reader 100 according to the second embodiment. When the power source is turned ON, the RFID reader 100 starts processing (main flow) shown in FIG. 4A. In step S401, the RFID reader 100 (the arithmetic unit 101) determines whether or not an RFID tag reading start instruction is given by a user. The processing in step S401 is similar to the processing in step S201 of the first embodiment. The processing from step S402 to step S405 is periodically and repeatedly executed at the timing of tag detection.

In step S402, the arithmetic unit 101 determines whether or not it is time to execute detection of an RFID tag. In a case where it is determined that it is time to detect an RFID tag (YES in step S402), the processing proceeds to step S406 (tag information obtaining processing), and in a case where it is determined that no RFID tag is detected (NO in step S402), the processing proceeds to step S403.

FIG. 4B is a flowchart illustrating tag information obtaining processing (step S406) according to the second embodiment. The processing from step S421 to step S426, and step S427 is similar to the processing from step S261 to step S266, and step S275 of the first embodiment (FIGS. 2D-1 and 2D-2). In step S421, the arithmetic unit 101 sets a period for collecting the RFID tag reading results (referred to as the "collection period" hereinafter). Here, it is presumed that a period from time Ta to time Tb is set as a collection period. In step S422, the arithmetic unit 101 starts reading the RFID tags. In step S423, the arithmetic unit 101 collects the RFID tag reading results in the collection period set. In step S424, the arithmetic unit 101 determines whether or not the RFID tag reading results collected in step S423 include a reference tag reading result. When the RFID tag reading results include the reference tag reading result (YES in step S424), the processing proceeds to step S425. On the other hand, when the RFID tag reading results do not include the reference tag reading result (in a case where no RFID tag is read, or in a case where no article tag is read (NO in step S424)), the processing proceeds to step S427. In step S425, the arithmetic unit 101 obtains position information from the reference tag reading result. In step S426, the arithmetic unit 101 performs flag processing (the position flag is set to 1) indicating that the position information calculated from the reference tag reading result is provided. In step S427, the arithmetic unit 101 updates management information, and ends the tag information obtaining processing. Note that the management information update is similar to the processing (step S265) in the first embodiment.

Returning to FIG. 4A, in step S403, the arithmetic unit 101 determines whether or not position information calculated from the reference tag reading result is provided. When the position flag is equal to 1, the arithmetic unit 101 determines that position information calculated from the reference tag reading result is provided (YES in step S403), and the processing proceeds to step S404. On the other hand, when the position flag is not equal to 1 (NO in step S403), the arithmetic unit 101 determines that position information calculated from the reference tag reading result is not provided, and advances the processing to step S407 (detection processing).

The detection processing in step S407 is the same processing as the detection processing of the first embodiment (FIG. 2B), except for the distance measurement processing executed in step S225, and thus is not shown. The distance measurement processing according to the second embodiment will be described with reference to the flowchart shown in FIG. 4C. In FIG. 4C, the processing from step S440 to step S448 is similar to the processing from step

S240 to step S248 in the distance measurement processing (FIG. 2C) of the first embodiment. In step S449, the arithmetic unit 101 updates management information based on the position calculated based on the results of measurement of the distances between the RFID reader 100 and the other RFID readers, and ends the distance measurement processing. Note that the management information update is similar to the processing in the first embodiment (step S265). When the distance measurement processing is completed, the processing proceeds to step S404 (FIG. 4A).

Returning to FIG. 4A, in step S404, the arithmetic unit 101 initializes a flag (the flag is set to 0) indicating that the position information calculated from the reference tag reading result is provided. In step S405, the arithmetic unit 101 determines whether or not an RFID tag reading end instruction is given by a user. In a case where the RFID tag reading end instruction is given by a user (YES in step S405), the arithmetic unit 101 stops the operation of the reading circuit 103, and stops communication with the RFID tag. In a case where the end instruction is not given (NO in step S405), the processing returns to step S402, and the above-described processing continues.

Figure 5A:
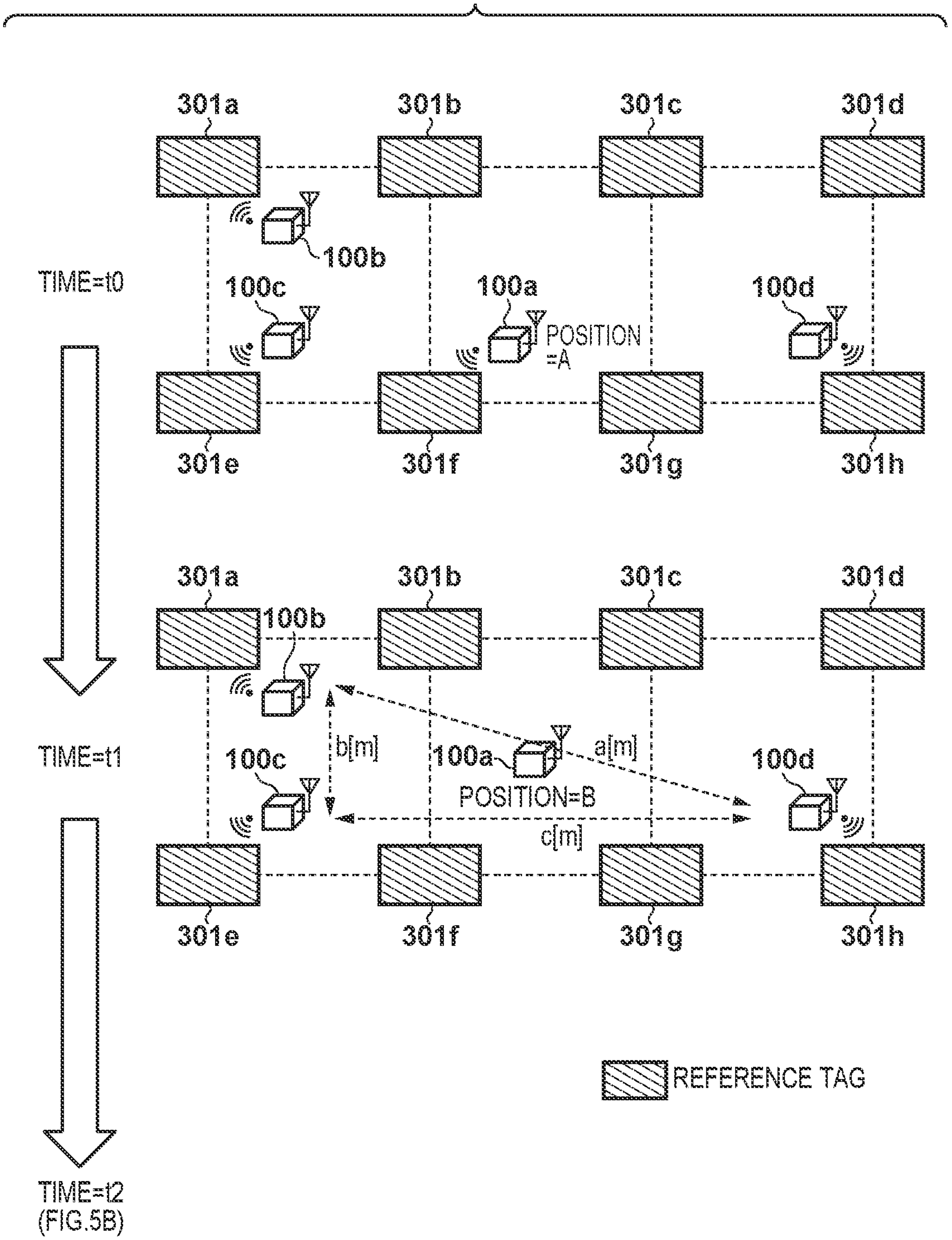
FIGS. 5A and 5B are diagrams showing operation examples of the RFID reader according to the second embodiment.
Figure 5B:
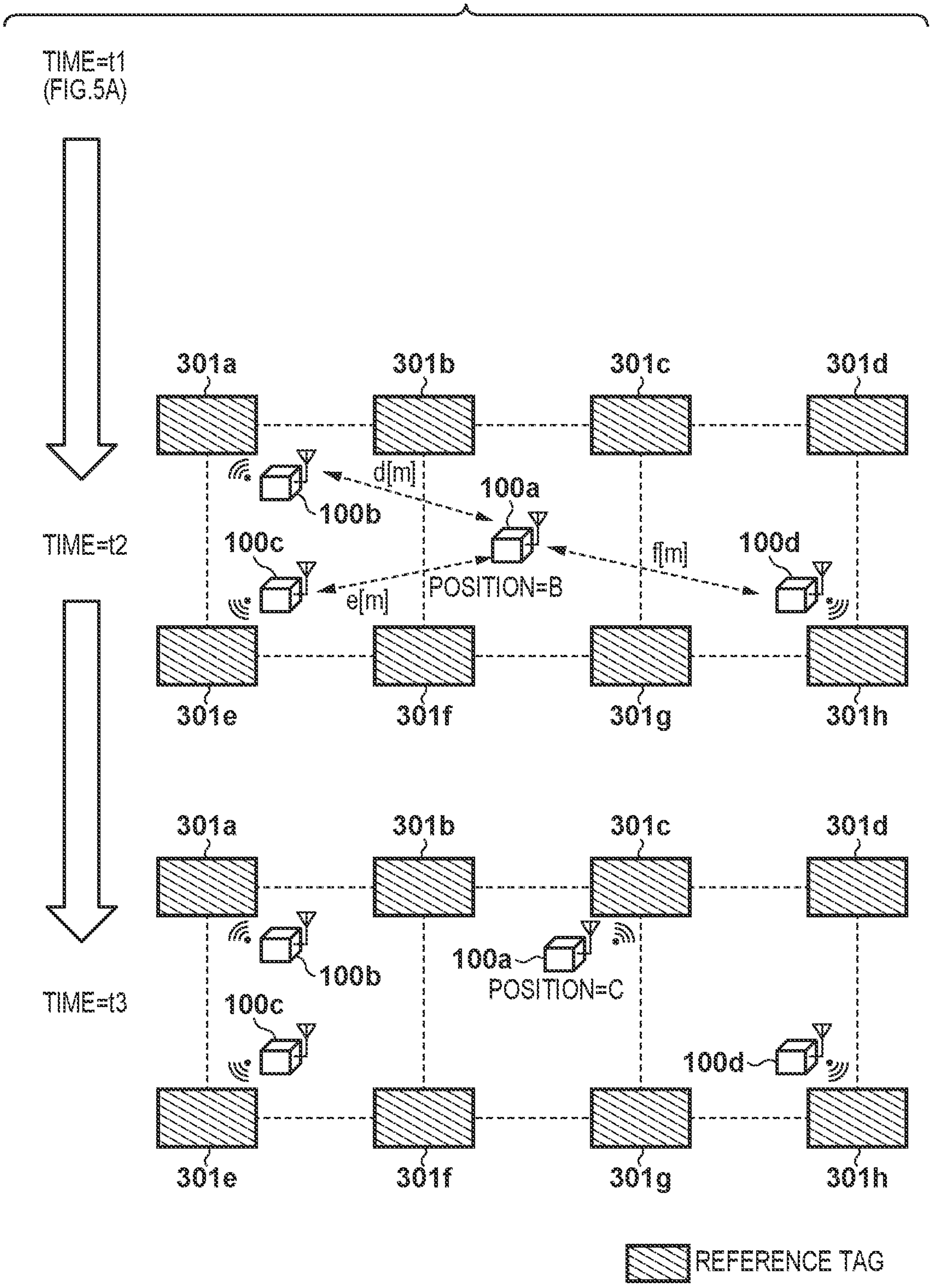

An example of operation performed in the processing according to the second embodiment described above using the flowcharts shown in FIGS. 4A to 4C will be further described using FIGS. 5A and 5B. As shown in FIGS. 5A and 5B, a position management system according to the second embodiment will be described below, assuming a situation where the RFID reader 100*a* moves from a position A to a position C via a position B. The RFID reader 100*a* detects an RFID tag at time t0, reads the reference tag 301*f*, and obtains position information. In a case where it is possible to obtain position information based on communication with the reference tag, the RFID reader 100*a* uses the position information as the position of the RFID reader 100*a*.

When the RFID reader 100*a* moves away from the position A and thus cannot detect the reference tag 301*f*, position information is obtained through ultra wide band (UWB) communication with the other RFID readers 100*b* to 100*d*. When the reference tag 301*f* can no longer be detected, in the tag information obtaining processing (step S406), the position flag indicating that the position information calculated from the reference tag reading result is provided will no longer be set to 1. When the position flag is equal to 0, the arithmetic unit 101 determines that position information calculated from the reference tag reading result is not provided (step S403), and detection processing (step S407) for detecting other RFID readers using UWB communication is started.

At time t1, the RFID reader 100*a* detects RFID readers 100*b* to 100*d* through UWB communication, and makes an inquiry about the execution status of communication with the reference tag. As a result of the inquiry, the RFID reader 100*a* determines that the periods for which the RFID readers 100*b*, 100*c*, and 100*d* are respectively communicating with the reference tags 301*a*, 301*e*, and 301*h* have each continued for the threshold or longer. In this case, the RFID reader 100*a* sets a period from time Ta to time Tb as a period for collecting the results of measurement of the distances between RFID readers 100*b* to 100*d* (referred to as the "collection period"), and requests execution of measurement of distances a, b, and c between the RFID readers 100*b* to 100*d*. Note that the distance a refers to the distance between the RFID reader 100*d* and the RFID reader 100*b*, the distance b refers to the distance between the RFID reader 100*b* and the RFID reader 100*c*, and the distance c refers to the distance between the RFID reader 100*c* and the RFID reader 100*d*.

The RFID readers 100*b* to 100*d* each execute the measurement of the distances a to c using UWB communication and transmit the distance measurement results to the RFID reader 100*a* using UWB communication. The RFID reader 100*a* receives the results of measurement of the distances a to c from the RFID readers 100*b* to 100*d*, and perform collection from time Ta to time Tb (collection period). The RFID reader 100*a* determines whether or not the upper/lower limit range of the distance measurement results obtained by measuring the distances a, b, and c collected in the collection period is within the threshold. Here, it is determined that the upper/lower limit range of the distance measurement results obtained by measuring the distances a, b, and c is within the threshold. At time t2, the RFID reader 100*a* executes measurement of the distance d between the RFID reader 100*a* and the RFID reader 100*b*, the distance e between the RFID reader 100*a* and the RFID reader 100*c*, and the distance f between the RFID reader 100*a* and the RFID reader 100*d*. The RFID reader 100*a* calculates the position B by performing position calculation using the three-point positioning method based on the obtained distances d to f, and the positions of the reference tags 301*a*, 301*e*, and 301*h*.

Then, the RFID reader 100*a* continues to move from the position B while repeatedly calculating position information obtained using the RFID readers 100*b* to 100*d* as references and detecting RFID tags. Note that calculation of position information using the RFID readers 100*b* to 100*d* as references is stopped before RFID tag detection is performed.

Upon arriving at the position C at time t3, the RFID reader 100*a* detects a reference tag 301*c*. When the RFID reader 100*a* is able to communicate with the reference tag 301*c*, the RFID reader 100*a* obtains the position information, and sets the position flag to 1, the position flag indicating whether the position information calculated from the reference tag reading result is provided. While the position flag indicating that the position information calculated from the reference tag reading result is provided is set to 1, obtaining of position information based on the reading of the reference tag 301*c* is continued. During this, the RFID reader 100*a* does not execute calculation of position information based on the distance measurement results obtained through communication with the other RFID readers 100*b* to 100*d*.

As described above, according to the second embodiment, in the RFID reader control system, in a case where communication with a reference tag is possible, position information is calculated from the reference tag, and in a case where communication with a reference tag is not possible, position information is calculated from information of the other RFID readers. Also, in a case where it is possible to obtain position information based on the reference tag, obtaining of position information using the other RFID readers is not executed. Position information can be more quickly obtained by switching the position calculation method depending on the state of communication with the reference tag. As a result, it is possible to obtain position information in real time using an RFID reader, thus increasing user convenience.

As described above, according to the above embodiments, it is possible to obtain position information even when the state where the RFID reader cannot detect an RFID tag (reference tag) that serves as a reference for identifying a position continues.

Another Embodiment

Note that, although the RFID readers 100*a* to 100*d* have the same function in the above embodiments, the present invention is not limited to this. It is sufficient that an external apparatus with which the RFID reader 100*a* communicates to obtain the position and perform distance measurement is capable of communication and distance measurement using the communication function of the communication circuit 105, and is capable of notifying the RFID reader 100*a* of its position, for example. Such an external apparatus does not need to have the function of obtaining the position based on the reference tag, and may be located at a predetermined position, for example. Also, because the three-point positioning method is used, three other RFID readers (external apparatuses) are detected in the above embodiments. However, the present invention is not limited to this. In a case where the distance and the direction (angle) can be detected as a positional relationship with other RFID readers (external apparatuses), it is possible to obtain the position using fewer than three other RFID readers (external apparatuses), for example.

As described above, a technique described in the present disclosure improves accuracy of position management performed using a communication apparatus having a function of communicating with a wireless device.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-017827, filed Feb. 8, 2023, which is hereby incorporated by reference herein in its entirety.

What is claimed is:

1. A communication apparatus comprising:

at least one memory that stores a set of instruction; and at least one processor that executes the instructions, the instructions, when executed, causing the communication apparatus to perform operations comprising:

obtaining first position information that is stored in a wireless device by communicating with the wireless device serving as a reference for identifying a position, using a first communication function;

measuring a positional relationship with an external apparatus based on communication with the external apparatus performed using a second communication function different from the first communication function;

obtaining second position information based on position information that is stored in the external apparatus and the positional relationship measured by the measuring unit; and selecting either the first position information or the second position information, as position information for position management of another wireless device with which communication is to be performed using the first communication function.

2. The communication apparatus according to claim 1, wherein in a case where the first position information and the second position information are both obtained, the selecting selects either the first position information or the second position information based on a relationship between a position indicated by the first position information and a position indicated by the second position information.

3. The communication apparatus according to claim 2, wherein in a case where a difference between the position indicated by the first position information and the position indicated by the second position information is smaller than a first threshold, the selecting selects the first position information.

4. The communication apparatus according to claim 3, wherein in a case where the difference between the position indicated by the first position information and the position indicated by the second position information is between the first threshold and a second threshold greater than the first threshold, and communication with the wireless device using the first communication function has continued for longer than a predetermined time, the selecting selects the first position information.

5. The communication apparatus according to claim 4, wherein in a case where the difference between the position indicated by the first position information and the position indicated by the second position information exceeds the second threshold, the selecting selects the second position information.

6. The communication apparatus according to claim 1, wherein in a case where only either the first position information or the second position information is obtained, the selecting selects the obtained position information.

7. The communication apparatus according to claim 1, wherein obtaining of the first position information and obtaining of the second position information are repeatedly and synchronously executed, and the selecting preferentially selects the first position information.

8. The communication apparatus according to claim 7, wherein in a case where the first position information is obtained, obtaining of the second position information is not executed.

9. The communication apparatus according to claim 1, wherein in a case where the communication apparatus is capable of communication, via the second communication function, with a predetermined number of external apparatuses that are communicating with wireless devices respectively serving as references for different positions, the measuring measures a distance between the communication apparatus and each of the predetermined number of external apparatuses.

10. The communication apparatus according to claim 9, wherein in a case where periods for which the predetermined number of external apparatuses are respectively communicating with the wireless devices serving as the references for positions have each continued longer than a predetermined time, the measuring measures a distance between the communication apparatus and each of the predetermined number of external apparatuses.

11. The communication apparatus according to claim 9, wherein in a case where a variation in mutual distances between the predetermined number of external apparatuses is smaller than a threshold, the measuring measures a distance between the communication apparatus and each of the predetermined number of external apparatuses.

12. The communication apparatus according to claim 11, wherein the measuring obtains the variation by transmitting a request to measure the mutual distances to the predetermined number of external apparatuses, and receiving a result of the measurement from the predetermined number of external apparatuses, using the second communication function.

13. The communication apparatus according to claim 1, wherein the operations further comprising:

performing the position management by associating position information selected by the selecting with information obtained through communication with the other wireless device.

14. A position management system comprising:

the communication apparatus according to claim 1;

the external apparatus; and the wireless device, wherein the position management system performs position management of the other wireless device using the position information selected by the selecting.

15. A method for controlling a communication apparatus, comprising:

obtaining first position information that is stored in a wireless device by performing communication with the wireless device serving as a reference for identifying a position, using a first communication function;

measuring a positional relationship with an external apparatus based on communication with the external apparatus performed using a second communication function different from the first communication function;

obtaining second position information based on position information that is stored in the external apparatus and the measured positional relationship; and selecting either the first position information or the second position information, for position management of another wireless device with which communication is to be performed using the first communication function.

16. A non-transitory computer-readable storage medium storing a program for causing a computer to execute a method for controlling a communication apparatus the method comprising:

obtaining first position information that is stored in a wireless device by performing communication with the wireless device serving as a reference for identifying a position, using a first communication function;

measuring a positional relationship with an external apparatus based on communication with the external apparatus performed using a second communication function different from the first communication function;

obtaining second position information based on position information that is stored in the external apparatus and the measured positional relationship; and selecting either the first position information or the second position information, for position management of another wireless device with which communication is to be performed using the first communication function.

* * * * *